United States Patent
Miller

(10) Patent No.: US 6,240,506 B1
(45) Date of Patent: *May 29, 2001

(54) EXPANDING INSTRUCTIONS WITH VARIABLE-LENGTH OPERANDS TO A FIXED LENGTH

(75) Inventor: Paul K. Miller, McKinney, TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/165,968

(22) Filed: Oct. 2, 1998

(51) Int. Cl.$^7$ .................................................... G06F 15/00
(52) U.S. Cl. .......................... 712/213; 712/210; 712/205
(58) Field of Search .................................. 712/204, 205, 712/237, 213, 208, 215, 212, 245, 210, 230, 234, 229, 211, 1, 39; 711/141, 208; 341/55; 717/9

(56) References Cited

U.S. PATENT DOCUMENTS

| | | | |
|---|---|---|---|
| 5,057,837 | * 10/1991 | Colwell et al. | 341/55 |
| 5,586,277 | * 12/1996 | Brown et al. | 712/210 |
| 5,758,114 | 5/1998 | Johnson et al. . | |
| 5,774,710 | 6/1998 | Chung . | |
| 5,809,273 | 9/1998 | Favor et al. . | |
| 5,822,778 | * 11/1999 | Dutton et al. | 711/208 |
| 5,832,299 | * 11/1998 | Wooten | 710/9 |
| 5,896,519 | 4/1999 | Worrell . | |
| 5,905,893 | 5/1999 | Worrell . | |
| 5,925,124 | 7/1999 | Hilgendorf et al. . | |
| 5,933,642 | * 8/1999 | Greenbaum et al. | 717/9 |
| 5,948,100 | 9/1999 | Hsu et al. . | |
| 5,951,671 | 9/1999 | Green . | |
| 5,958,046 | * 9/1999 | Bondi et al. | 712/230 |
| 5,978,906 | 11/1999 | Tran . | |
| 5,983,334 | 11/1999 | Coon et al. . | |
| 5,991,869 | * 11/1999 | Tran et al. | 712/204 |
| 6,012,125 | 1/2000 | Tran . | |

(List continued on next page.)

Primary Examiner—Larry D. Donaghue
(74) Attorney, Agent, or Firm—Conley Rose & Tayon, P.C.; Dan R. Christen

(57) ABSTRACT

A microprocessor configured to predecode instructions with variable address and operand lengths into a uniform format with constant address and operand lengths is disclosed. The microprocessor may comprise a predecode unit configured to receive instruction bytes from a main memory subsystem. The predecode unit is configured to detect instructions having prefix bytes that override default operand and address field lengths. This information, combined with the instruction's default operand and address length, allows the predecode unit to expand addresses and operands that are shorter than the predetermined uniform length. The operands and addresses are expanded by padding them with constants. Once the instructions are padded to a uniform format, they are stored in an instruction cache. An address translation table may be used to translate fetch addresses, thereby compensating for the offset created by the padding constants. The microprocessor may also be configured to detect the execution of instructions that modify segment default address and operand lengths. Upon detecting the execution of this type of instruction, the microprocessor may be configured to flush the contents of the instruction cache and address translation table. An optional secondary cache may store unpadded versions of the instructions to speed rebuilding of the instruction cache and address translation table after a flush. A computer system and method for predecoding instructions are also disclosed.

21 Claims, 9 Drawing Sheets

U.S. PATENT DOCUMENTS

| | | | |
|---|---|---|---|
| 6,014,735 * | 1/2000 | Chennupaty et al. | 712/210 |
| 6,016,545 | 1/2000 | Mahalingaiah et al. . | |
| 6,023,756 * | 2/2000 | Okamura | 712/208 |
| 6,035,387 | 3/2000 | Hsu et al. . | |
| 6,038,645 * | 3/2000 | Nanda et al. | 711/141 |
| 6,049,863 | 4/2000 | Tran et al. . | |
| 6,061,786 * | 5/2000 | Witt | 712/237 |

* cited by examiner

| D FLAG(144) IN CODE SEGMENT DESCRIPTOR | 0 | 0 | 0 | 0 | 1 | 1 | 1 | 1 |
|---|---|---|---|---|---|---|---|---|
| OPERAND-SIZE PREFIX 66(HEX) | NOT PRESENT | NOT PRESENT | PRESENT | PRESENT | NOT PRESENT | NOT PRESENT | PRESENT | PRESENT |
| ADDRESS-SIZE PREFIX 67(HEX) | NOT PRESENT | PRESENT | NOT PRESENT | PRESENT | NOT PRESENT | PRESENT | NOT PRESENT | PRESENT |
| EFFECTIVE OPERAND SIZE | 16 | 16 | 32 | 32 | 32 | 32 | 16 | 16 |
| EFFECTIVE ADDRESS SIZE | 16 | 32 | 16 | 32 | 32 | 16 | 32 | 16 |

Fig. 5

EXPANDING INSTRUCTIONS WITH VARIABLE-LENGTH OPERANDS TO A FIXED LENGTH

CROSS REFERENCE AND RELATED APPLICATIONS

The following applications generally relate to this application:

U.S. patent application Ser. No. . 09/158,440, filed on Sep. 21, 1998, currently pending;

U.S. patent application Ser. No. . 09/157,721, filed on Sep. 21, 1998, currently pending.

U.S. patent application Ser. No. . 09/157,647, filed on Sep. 21, 1998, currently pending;

U.S. patent application Ser. No. . 09/157,626, filed on Sep. 21, 1998, currently pending;

U.S. patent application Ser. No. . 09/157,719, filed on Sep. 21, 1998, currently pending; and U.S. patent application Ser. No. . 09/002,902, filed on Jan. 5, 1998, issued as U.S. Pat. No. 6,081,884 on Jun. 27, 2000.

BACKGROUND OF THE INVENTION

1. Field of the Invention

This invention relates to microprocessors configured to execute variable-length instruction sets, and in particular, instruction sets having address and operand size prefixes.

2. Description of the Relevant Art

The number of software applications written for the x86 instruction set is immense. As a result, despite the introduction of newer and more advanced instruction sets, microprocessor designers have continued to design microprocessors capable of executing the x86 instruction set.

The x86 instruction set is relatively complex and is characterized by a plurality of variable-length instructions. A generic format illustrative of the x86 instruction set is shown in FIG. 1. As the figure illustrates, an x86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more of the optional prefix bytes 102. For example, one of prefix bytes 102 may be used to override the default segment used in memory addressing or to instruct the processor to repeat a string operation a number of times.

Two prefix bytes are of particular importance. A prefix byte of 66(hex) represents the OPSIZ prefix, which reverses the default the operand size for an instruction. A prefix byte of 67(hex) represents the ADRSIZ prefix, which reverses the default address size for an instruction. The default operand and address size of an instruction is determined by a default bit within the instruction's segment descriptor. If the default bit is set, then the default address and operand size is 32-bits. A prefix of 66(hex) or 67(hex) will override a set default bit, thereby allowing an instruction to use a 16-bit opcode or address, respectively. Similarly, if the default bit is not set, then the default address and operand size is 16-bits. A prefix of 66(hex) or 67(hex) will then override the unasserted default bit and allow the instruction following the prefix to use a 32-bit opcode or address, respectively. Thus, not only does the length of an x86 instruction depend upon how many prefix bytes precede the instruction, but also upon the value of the default bit in the instruction's segment descriptor and the presence of specific prefix bytes 66(hex) and 67(hex).

The opcode field 104 follows prefix bytes 102 (if present) and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field within SIB byte 108 specifies which register contains the base value for the address calculation, and an index field within SIB byte 108 specifies which register contains the index value. A scale field within SIB byte 108 specifies the power of two by which the index value will be multiplied before being added, along with any displacement, to the base value. The next instruction field is a displacement field 110, which is optional and may be from one to four bytes in length. Displacement field 110 contains a constant used in address calculations. The optional immediate field 112, which may also be from one to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

The complexity of the x86 instruction set poses many difficulties in implementing high performance x86-compatible microprocessors. In particular, the variable length of x86 instructions, the nature of the prefix bytes, and reliance upon the segment descriptor makes scanning, aligning, and decoding instructions difficult. Scanning refers to reading a group of instruction bytes (either from an instruction cache within the microprocessor or from an external memory) and determining the boundaries of instructions contained therein. Alignment refers to the process of masking off undesired instruction bytes and shifting the desired instruction bytes so that the first bit of the desired instruction is in a desired position. Decoding instructions typically involves identifying each field within a particular instruction, e.g., the opcode and operand fields. Decoding typically takes place after the instruction has been fetched from the instruction cache, scanned, and aligned.

One method for aligning instructions involves generating a number of predecode bits for each instruction byte read from main memory. The predecode bits provide information about the instruction byte they are associated with. For example, an asserted predecode start bit indicates that the associated instruction byte is the first byte of an instruction. Similarly, an asserted predecode end bit indicates that the associated instruction byte is the last byte of an instruction. Once the predecode bits for a particular instruction byte are calculated, they are stored together with the instruction byte in an instruction cache. When a "fetch" is performed, i.e., a number of instruction bytes are read from the instruction cache, the associated start and end bits are also read. The start and end bits may then be used to generate valid masks for the individual instructions with the fetch. A valid mask is a series of bits in which each bit corresponds to a particular instruction byte. Valid mask bits associated with the first byte of an instruction, the last byte of the instruction, and all bytes between the first and last bytes of the instruction are asserted. All other valid mask bits are not asserted.

Turning now to FIG. 2, an exemplary valid mask is shown. The figure illustrates a portion of a fetch block 120 and its associated start and end bits 122 and 124. Assuming a valid mask 126 for instruction B 128 is to be generated, start and end bits 122 and 124 would be used to generate the mask. Valid mask 126 could then be used to mask off all bytes within fetch 120 that are not part of instruction B 128. Once the boundaries of an instruction have been determined, alignment and decoding may be performed.

Unfortunately, the tasks of scanning and aligning x86 instructions typically require a number of cascaded levels of logic. Thus, scanning and alignment may require a significant amount of time and, when added to the time required to perform decoding, may create a significant delay before any instructions are available to the functional stages of the microprocessor's pipeline. As microprocessors increase the number of instructions they are able to execute per clock cycle, slow instruction scanning and alignment may become a performance limiting factor. Therefore, a mechanism for reducing the complexity and time required for instruction scanning and alignment is needed.

SUMMARY OF THE INVENTION

The problems outlined above may in part be solved by a microprocessor configured to receive instructions having varying address and operand sizes and then predecode them into a single fixed-sized format. During predecode, the microprocessor may be configured to detect prefix bytes that override an instruction'default address and operand length, thus allowing the instructions to be "recast" into a single fixed size format. Advantageously, in some embodiments this may simplify instruction scanning and alignment.

In one embodiment, the microprocessor may comprise a predecode unit and an instruction cache. The predecode unit may be configured to receive instruction bytes from a main memory subsystem. The predecode unit may then be configured to detect instructions having prefix bytes that override default operand and address field lengths. The predecode unit may also be configured to expand operand and address fields that are shorter than a predetermined length. The instruction cache, which is coupled to a predecode unit, is configured to receive and store the predecoded instructions from the predecode unit. In one embodiment, the predecode unit may be configured to expand the operand and address field to the predetermined length by padding them with constants (e.g., zero) to increase uniformity of the address and operand fields. Advantageously, increasing the uniformity may in some embodiments improve scanning and alignment times.

In another embodiment, the predecode unit may be further configured to delete any prefix bytes that override default operand and address field lengths before the instruction is stored in the instruction cache. Instead, the deleted prefix bytes are reflected in the reformatted instruction by compacting multiple prefix bytes into a uniformly sized set of bits. This may further improve uniformity among instructions by reducing the number of potential prefix bytes. In another embodiment, the microprocessor may further comprise an address translation table coupled to the instruction cache. In one embodiment, the address translation table may operate similarly to a translation lookaside buffer (TLB). The address translation table may be configured to store pointers to instructions stored within the instruction cache. The address translation table may allow access to padded instructions despite the offsetting effect of the padding constants.

The microprocessor may further be configured to detect the execution of instructions that change the default operand and address size of a segment. Upon detecting the execution of such and instruction, the microprocessor may be configured to flush the contents of the instruction cache and address translation table because they may no longer be accurate representations of the original instructions. In another embodiment, the microprocessor may be configured to only flush instructions corresponding to the changed memory segment. Alternatively, flushing may occur only when a code segment has been changed (i.e., not a data segment).

In still another embodiment, the predecode unit may be further configured to generate one or more predecode bits for each instruction byte. These predecode bits may be stored in the instruction cache along with the predecoded instructions to further speed scanning and alignment times.

The microprocessor may also be configured with a secondary cache coupled to the predecode unit. The predecode unit may be configured to store all instruction bytes received and all corresponding predecode bits generated in the secondary cache. The secondary cache is configured to store an unpadded and unaltered version of the instruction bytes received. This may allow the contents of the instruction cache and address translation table to be more rapidly rebuilt after a flush occurs.

A method for predecoding instructions is also contemplated. In one embodiment, the method comprises reading a plurality of instruction bytes from a main memory subsystem. Next, instructions within the plurality of instruction bytes that have prefix bytes overriding the instructions' default address and operand field sizes are detected. With this information, address and operand fields that are smaller than a predetermined size are expanded using padding constants. The expanded instructions are then stored in an instruction cache. An address translation table for the predecoded instructions stored in the instruction cache may be maintained. Furthermore, one or more predecode bits may be generated for each instruction byte. In addition, an unaltered version of each instruction may be stored in a secondary cache along with any corresponding predecode bits.

In another embodiment, the method may further comprise detecting the execution of instructions that modify segment descriptors (which determine default address and operand lengths). Upon detecting the execution of such an instruction, the instruction cache and address translation table may be flushed. The secondary cache may then be used to rebuild the contents of the instruction cache and address translation table.

A computer system capable of rapid instruction decoding is also contemplated. In one embodiment, the computer system comprises a microprocessor coupled to a CPU bus. The microprocessor may be configured as described above. The computer system may further comprise a number of peripheral devices (e.g. a modem) coupled to the microprocessor via the CPU bus. In another embodiment, the computer system may further comprise additional microprocessors coupled to each other via the CPU bus.

BRIEF DESCRIPTION OF THE DRAWINGS

Other objects and advantages of the invention will become apparent upon reading the following detailed description and upon reference to the accompanying drawings in which:

FIG. 5 is a table illustrating details of the combined effect that changes in the segment descriptor of FIG. 4 and selected instruction prefix bytes have on address and operand length.

Figure 1:
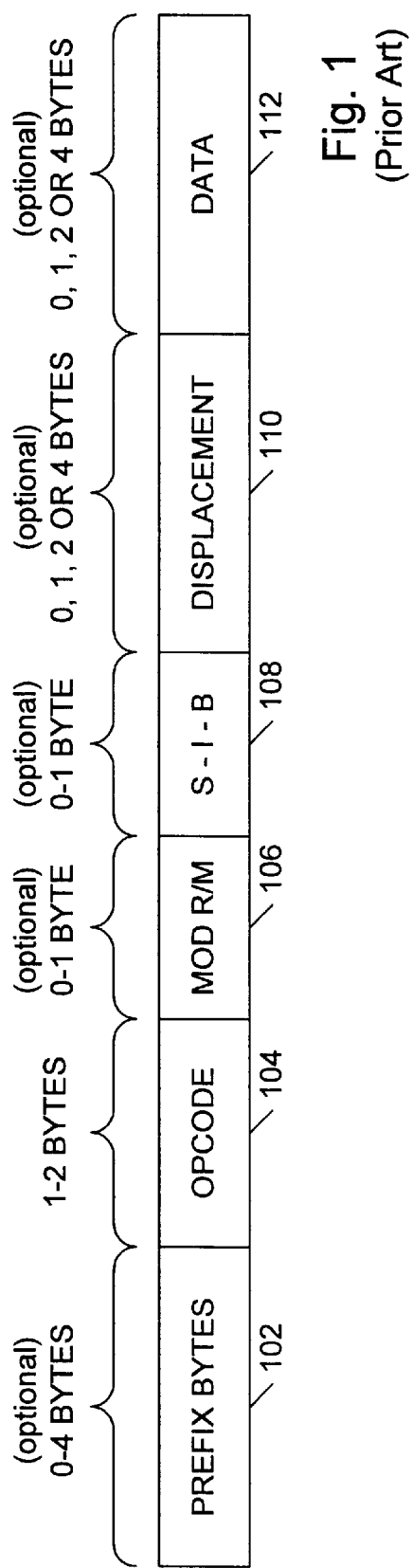
FIG. 1 is a block diagram illustrating the generic format of the x86 instruction set.
Figure 2:
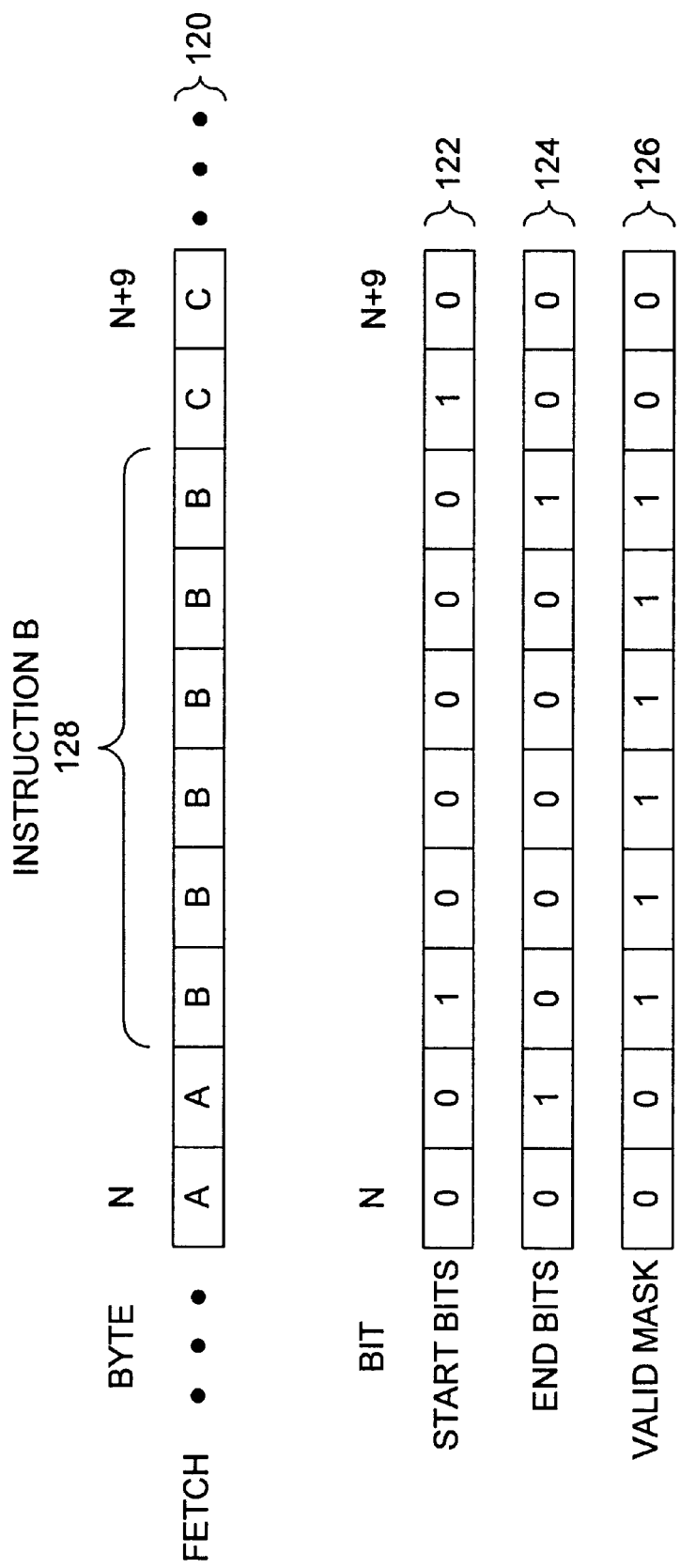
FIG. 2 is a block diagram illustrating one embodiment of a valid mask.

While the present invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Figure 3:
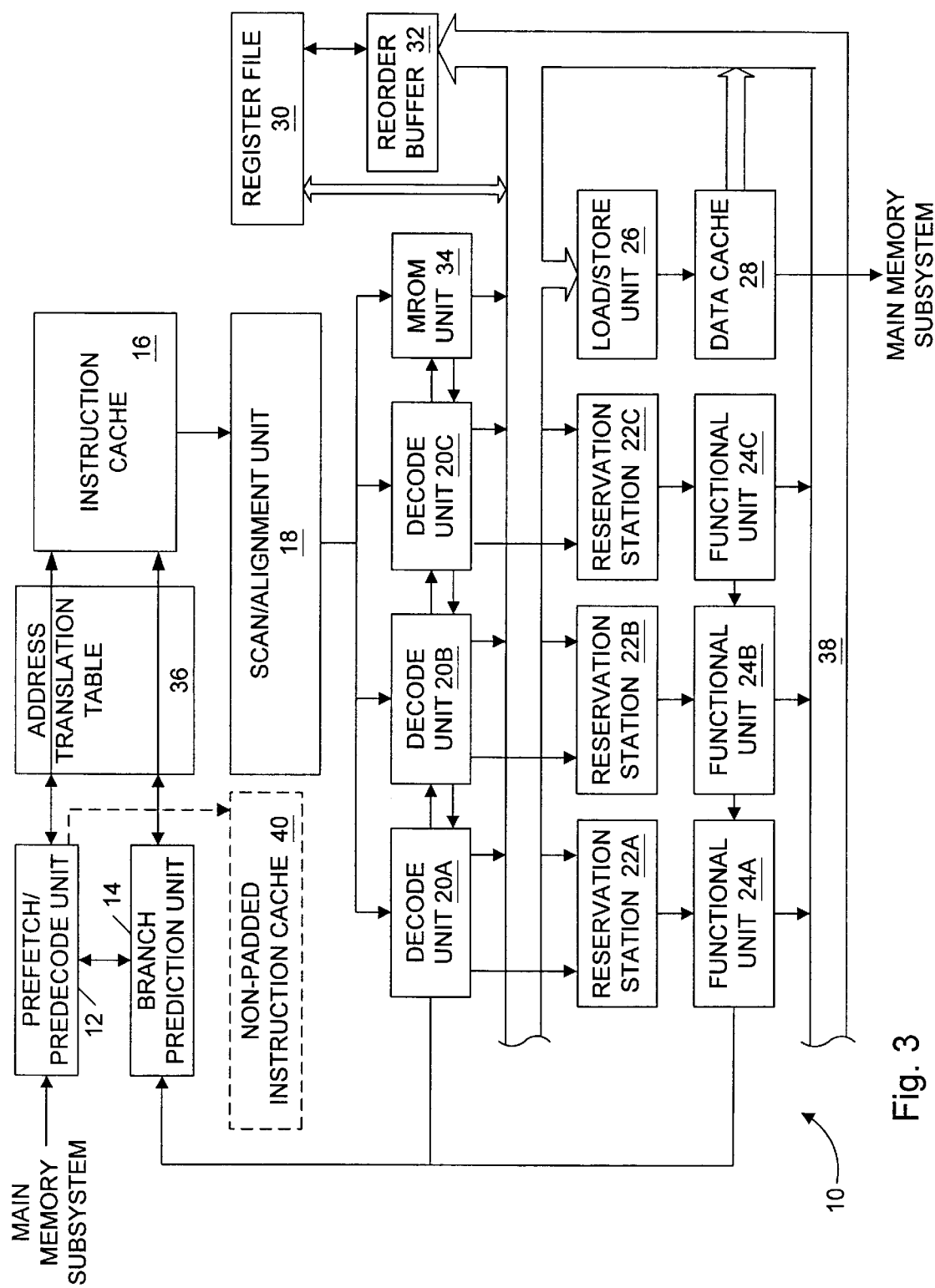
FIG. 3 is a block diagram illustrating one embodiment of a microprocessor configured to predecode instructions for rapid scanning and alignment.

Turning now to FIG. 3, a block diagram of one embodiment of a microprocessor 10 that is configured to predecode instructions having varying address and operand lengths is shown. In this embodiment, microprocessor 10 includes a prefetch/predecode unit 12, a branch prediction unit 14, and an address translation table 36 coupled to an instruction cache 16. An optional secondary cache 40 is coupled to prefetch/predecode unit 12. Scan/alignment unit 18 is coupled between instruction cache 16, decode units 20A–C, and a microcode read-only memory (MROM) unit 34. Decode units 20A–C and MROM unit 34 are coupled to reservation stations 22A–C, which are in turn coupled to functional units 24A–C. A reorder buffer 32 is coupled to a register file 30, and a load/store unit 26 is coupled to a data cache 28. Functional units 24A–C, data cache 28, load store unit 26, reorder buffer 32, register file 30, MROM unit 34, decode units 20A–C, and reservation stations 22A–C are coupled together by result bus 38.

Generally speaking, instruction cache 16 is a high speed cache memory provided to temporarily store instructions before they are fetched and conveyed to scan/alignment unit 18. In one embodiment, instruction cache 16 is configured to store up to 64 kilobytes of instruction code organized in cache lines of 64 bytes each (where each byte consists of eight bits). Cache lines represent the smallest resolution for writes to instruction cache 16. For example, a 64-byte cache line means each write to instruction cache 16 will involve storing one or more 64-byte blocks of instruction bytes. Instruction bytes are stored in instruction cache 16 by prefetch/predecode unit 12, which prefetches the desired bytes from a main memory (not shown). It is noted that instruction cache 16 could be implemented in a set-associative, fully-associative, or direct-mapped configuration. Furthermore, instruction cache 16 may be addressed in a number of different ways, e.g., physically or linearly addressed.

Prefetch/predecode unit 12 prefetches instruction code from the main memory sub-system for storage within instruction cache 16. A variety of specific code prefetching techniques and algorithms may be employed by prefetch/predecode unit 12. As prefetch/predecode unit 12 receives instructions from the main memory subsystem, prefetch/predecode unit 12 is configured to detect each instruction's default address and operand size. In embodiments having a segmented memory model (e.g., x86 compatible embodiments of microprocessor 10), this may be determined by reading the segment descriptor of the segment from which the instruction was read. This is described in greater detail below (see Segments and Segment Descriptors). In x86 compatible embodiments, an instruction's default address and operand size may be either sixteen or thirty-two bytes.

Prefetch/predecode unit 12 is also configured to detect prefix bytes that alter an instruction's default address and operand length. For example, in the x86 architecture a prefix byte of 66(hex) overrides the default operand size. If the default operand size for an instruction is 32 bytes (as specified by the instruction's segment descriptor), a 66(hex) prefix byte will result in a 16 byte operand. Similarly, if the default operand size for the instruction is 16 bytes (as specified by the instruction's segment descriptor), a 66(hex) prefix byte will result in a 32 byte operand. Prefix byte 67(hex) operates in the same manner for address size. If the default address size for an instruction is 32 bytes (as specified by the instruction's segment descriptor), a 67(hex) prefix byte will result in a 16 byte address. Similarly, if the default address size for the instruction is 16 bytes (as specified by the instruction's segment descriptor), a 67(hex) prefix byte will result in a 32 byte address.

Once an instruction's address and operand sizes have been determined, prefetch/predecode unit 12 is configured to predecode the instruction to a uniform address and operand size format. For example, in x86-compatible embodiments prefetch/predecode unit 12 may be configured to predecode all instructions to a uniform format with 32-bit addresses and operands. Any instructions detected having 16-bit operands or addresses may be "padded" so that they have 32-bit addresses and operands. For example, a sixteen bit operand having a value of C4AB(hex) may be padded with a constant (e.g., zero) to create a 32-bit operand having a value of 0000C4AB(hex). Once the instructions have been predecoded, they may be stored in instruction cache 16. Prefix bytes that do not influence operand or address size may be compressed into a fixed length (e.g., one byte) and then stored as part of the instructions.

Note, however, instructions that are expanded by padding may require additional storage space. The additional bytes that are added to the instructions by padding may also shift each instruction's location. To remedy this, in one embodiment microprocessor 10 may utilize address translation table 36. Address translation table 36 is configured to store the address of each instruction stored in instruction cache 16, along with a pointer to the corresponding storage location in instruction cache 16 where the instruction is stored. Secondary cache 40 may be used to store unpadded versions of instructions for use when instruction cache 16 and address translation table 36 need to be rebuilt. More details regarding the operation of address translation table 36, instruction cache 16, and secondary instruction cache 40 will be disclosed further below.

In addition to predecoding instructions to a uniform format, in another embodiment prefetch/predecode unit 12 may also be configured to generates the following predecode bits for each instruction byte: a start bit, an end bit, and a functional bit. As previously noted, asserted start bits mark the first byte of each instruction, while asserted end bits mark the last byte of each instruction. Asserted functional bits mark the opcode bytes of each instruction. The predecode bits form tags which may be used to speed alignment and decoding. The predecode tags may also include additional information such as whether a particular instruction may be decoded directly by decode units 20A–B or whether the instruction is to be executed by invoking a microcode procedure stored within MROM unit 34. The predecode tags may be stored along with the instruction bytes in instruction cache 16.

Scan/alignment unit 18, which is coupled to instruction cache 16, is configured to receive each instruction (and any associated predecode information, if necessary) output from instruction cache 16. Scan/alignment unit 18 receives each instruction, scans the corresponding predecode information, if any, and determines the boundaries of each instruction and each field within each instruction. Once aligned, each instruction is conveyed to one of decode units 20A–C. In one embodiment, scan/alignment unit 18 may be configured to detect predecode tags indicative of MROM instructions (i.e., instructions that are executed by invoking a sequence of microcode instructions) and route them to MROM unit 34.

Before describing the operation of prefetch/predecode unit 12, address translation table 36, and instruction caches 16 and 40 in greater detail, other general aspects of microprocessor 10 will be discussed. Note the configurations illustrated below are meant for explanatory purposes only. Numerous other configurations of microprocessor 10 are possible and contemplated. For example, instead of implementing instruction cache 16 and data cache 28 separately as shown, in some embodiments a unified instruction and data cache may be used.

Decode units 20A–C are configured to receive aligned instructions from scan/alignment units 18A–B and decode them into an internal, bit-encoded, fixed-length format. In one embodiment, each decode unit 20A–C may be configured to receive and decode one or more instructions per clock cycle.

To improve the flow of data from instruction cache 16 to decode units 20A–C, each decode unit may have a FIFO (first-in first-out) memory buffer at its input to receive and store the aligned instructions until the respective decode unit is ready to begin decoding them. For example, each decode unit may have a 32-byte FIFO configured to store two instructions (each up to a maximum of sixteen bytes long). Note that decode units 20A–C are drawn as single boxes for exemplary purposes only. Each decode unit 20A–C may comprises a number of individual decoders each configured to decode a single instruction.

Microprocessor 10 may be configured to support out of order execution, and thus employ reorder buffer 32 to keep track of the original program sequence for register read and write operations, to implement register renaming, to allow for speculative instruction execution and branch misprediction recovery, and to facilitate precise exceptions. As will be appreciated by those of skill in the art, a temporary storage location for storing speculative register states is reserved within reorder buffer 32 upon decode of an instruction that involves the update of a register. Reorder buffer 32 may be implemented in a first-in-first-out (FIFO) memory wherein speculative results move to the "bottom" of the buffer as they are validated and written to the register file, thus making room for new entries at the "top" of the buffer. Other specific configurations of reorder buffer 32 are also possible, as will be described further below. If a branch prediction is incorrect, the results of speculatively-executed instructions along the mispredicted path can be invalidated in the buffer before they are written to register file 30.

The bit-encoded execution instructions and immediate data provided at the outputs of decode units 20A–20C are routed directly to respective reservation station units 22A–22C. In one embodiment, each reservation station unit 22A–22C is capable of holding instruction information (i.e., bit encoded execution bits as well as operand values, operand tags and/or immediate data) for up to three pending instructions awaiting issue to the corresponding functional unit. It is noted that for the embodiment shown in the figure, each decode unit 20A–20C is associated with a dedicated reservation station unit 22A–22C, and that each reservation station unit 22A–22C is similarly associated with a dedicated functional unit 24A–24C. Accordingly, three dedicated "issue positions" are formed by decode units 20A–C, reservation station units 22A–C and functional units 24A–C. Instructions aligned and dispatched to issue position 0 through decode unit 20A are passed to reservation station unit 22A and subsequently to functional unit 24A for execution. Similarly, instructions aligned and dispatched to decode unit 20B are passed to reservation station unit 22B and into functional unit 24B, and so on.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or tag) is provided from reorder buffer 32 rather than from register file 30. If there is no location reserved for a required register in reorder buffer 32, the value is taken directly from register file 30. If the operand corresponds to a memory location, the operand value is provided to the reservation station unit through load/store unit 26.

Reservation station units 22A–22C are provided to temporarily store instruction information to be speculatively executed by the corresponding functional units 24A–24F. As stated previously, each reservation station unit 22A–22F may store instruction information for up to three pending instructions. Each of the three reservation stations 22A–22C contain locations to store bit-encoded instructions to be speculatively executed by the corresponding functional unit and the values of operands. If a particular operand is not available, a tag for that operand is provided from reorder buffer 32 and is stored within the corresponding reservation station 22A–22C until the result has been generated (i.e., by completion of the execution of a previous instruction). It is noted that when an instruction is executed by one of the functional units 24A–24C, the result of that instruction is passed directly to any reservation stations 22A–22C that are waiting for that result at the same time the result is passed to update reorder buffer 32 (this technique is commonly referred to as "result forwarding").

Instructions are issued to their corresponding functional units for execution after the values of any required operand (s) are made available. In some cases, an operand associated with a pending instruction within one of reservation station units 22A–22C will be tagged with the location of a previous result value stored in reorder buffer 32 that corresponds to an instruction which modifies the required operand. In this situation the instruction is not issued to the corresponding functional unit 24A–C until the operand result for the previous instruction has been received. Accordingly, the order in which instructions are executed may not be the same as the order of the original program instruction sequence (i.e., they may be executed "out-of-order"). Reorder buffer 32 ensures that data coherency is maintained in situations where read-after-write dependencies occur.

In one embodiment, each of the functional units 24A–C is configured to perform integer arithmetic operations of addition and subtraction, as well as shifts, rotates, logical operations, and branch operations. It is noted that a floating point unit (not shown) may also be employed to accommodate floating point operations.

Each of the functional units 24A–C also provide information regarding the execution of conditional branch instructions to branch prediction unit 14. If a branch prediction was incorrect, branch prediction unit 14 flushes instructions after the mispredicted branch that have entered the instruction processing pipeline, and causes prefetch/predecode unit 12 to fetch the required instructions from instruction cache 16 or main memory. In this situation, the results of executed instructions occurring after the mispredicted branch instruction are discarded, including those which were speculatively executed and temporarily stored in load/store unit 26 and reorder buffer 32.

Results produced by functional units 24A–C are sent to reorder buffer 32 if a register value is being updated, and to load/store unit 26 if the contents of a memory location is changed. If the result is to be stored in a register, reorder buffer 32 stores the result in the location reserved for the value of the register when the instruction was decoded. As stated previously, results are also broadcast to reservation station units 22A–2C where pending instructions may be waiting for the results of previous instruction executions to obtain the required operand values.

Generally speaking, load/store unit 26 provides an interface between functional units 24A–24C and data cache 28. In one embodiment, load/store unit 26 is configured with a load/store buffer with eight storage locations for data and address information for pending loads or stores. Decode units 20A–C arbitrate for access to the load/store unit 26. When the buffer is full, decode units 20A–C wait until more storage space becomes available in load/store unit 26 for additional load or store requests. Load/store unit 26 also performs dependency checking for load instructions against pending store instructions to ensure that data coherency is maintained.

Data cache 28 is a high speed cache memory provided to temporarily store data being transferred between load/store unit 26 and the main memory subsystem. In one embodiment, data cache 28 has a capacity of storing up to 32 kilobytes of data. It is understood that data cache 28 may be implemented in a variety of specific memory configurations, including set-associative, direct mapped, and fully-associative configurations.

Segments and Segment Descriptors

In processors having a segmented memory model, the address space is divided into segments. Each program can access only data contained in those segments. Within each segment the addressing is linear, and the program can access byte 0, byte 1, byte 2, and so on. The addressing is relative to the start of the segment, however, and the hardware address associated with software address zero is hidden from the programmer. Each segment has its own descriptor which stores specific information about the corresponding segment, e.g., the segment base address.

Figure 4:
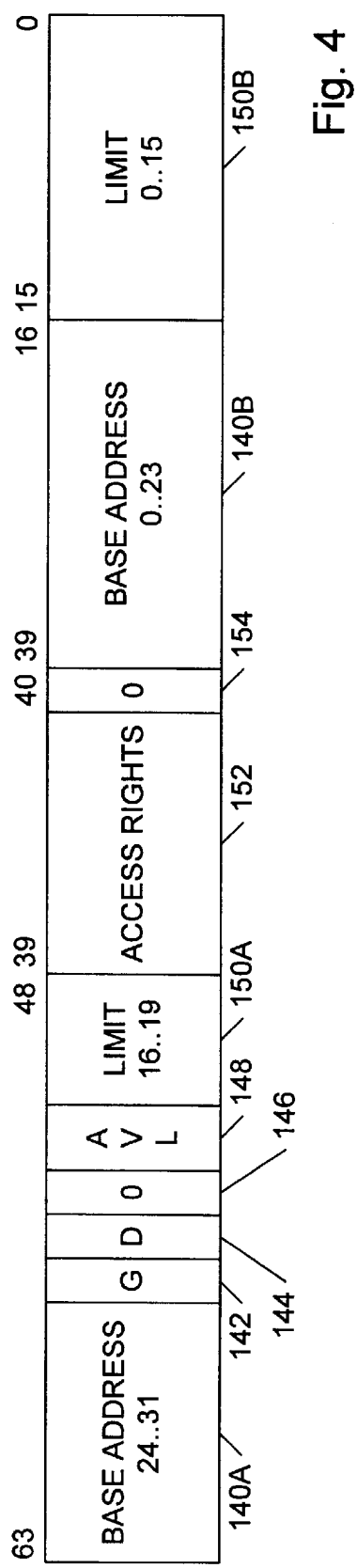
FIG. 4 is a block diagram illustrating details of one embodiment of a segment descriptor.

Turning now to FIG. 4, an exemplary format for a segment descriptor in the x86 architecture is shown. Fields 140A–B stores the base address portion of the descriptor and have a combined total length of 32 bits. Fields 150A–B store the limit or the last addressable unit of the segment. Fields 150A–B have a combined total length of 20 bits. Granularity bit 142 is closely related to limit field 150A–B. Granularity bit 142 specifies whether the resolution of the segment is a byte (G=0) or a page (G=1). A page is typically defined as 4,096 bytes. Default bit 144 determines the default address and operand size for the segment. A default bit 144 of zero sets a default operand and address size of 16 bytes. Conversely, a default bit of one sets a default operand and address size of 32 bytes. The interaction of default bit 144 and various instruction prefix bytes will be described in further detail below. Bit 146 is set to zero and is reserved for future use. AUVL bit 148 is available for use by system programmers. Possible uses include marking segments for garbage collection or indicating segments having based addresses that should not be modified. Access rights field 152 stores various access information about the segment. For example, type information is included to indicate the types of operations allowed on the segments (e.g., read-only, read-write, etc.). Bit 154 is set to zero and is also reserved for future use. Base address field 156 stores the base address for the segment.

Turning now to FIG. 5, a table showing the interaction between prefix bytes 66(hex) and 67(hex) and segment descriptor default flag 144 are shown. As the figure illustrates, prefix byte 66(hex) overrides the default operand size. Similarly, prefix byte 67(hex) overrides the default address size.

Details of Address Translation Table

Figure 6:
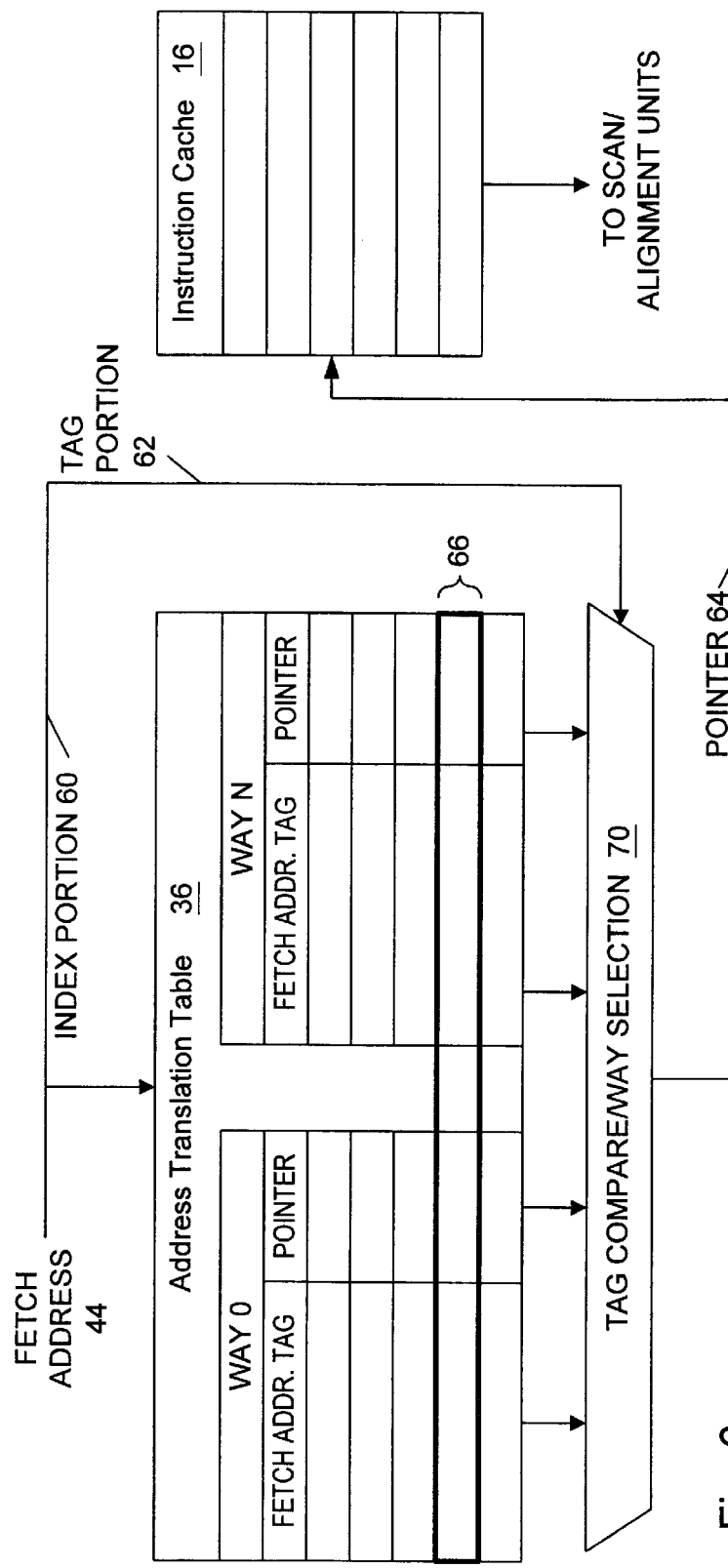
FIG. 6 is a diagram illustrating one embodiment of the address translation table from FIG. 3.

Turning now to FIG. 6, details of one embodiment of address translation table 36 are shown. In this embodiment, address translation table 36 is configured to be set associative, with each set (i.e., row) comprising multiple ways (i.e., columns). When prefetch/predecode unit 12 has completed predecoding an instruction, it is conveyed to instruction cache 16 for storage. In parallel, prefetch/predecode unit 12 is configured to convey the address of the instruction to address translation table 36, which allocates a storage location to the instruction. An index portion 60 of the instruction's address is used to select the set or row. The storage location may then be selected from any of the available storage locations within the row. For example, if table 36 is configured as a 4-way set-associative array, then each instruction may be allocated one of the four different storage locations that comprise the set or row corresponding to the index portion of the instruction's address. If none of the four storage locations is available (i.e., if they are all full), then one of the storage locations may be overwritten based on some type of replacement scheme, e.g., a least recently used (LRU) scheme. Note, table 36 may be implemented in other configurations, e.g., as a fully-associative array.

Once the instruction is stored in a storage location within instruction cache 16 and a storage location in address translation table 36 has been allocated, the pointer to the instruction's storage location within instruction cache 16 is stored in address translation table 36. This mechanism allows instructions to be padded and stored in any location within instruction cache 16. Address translation table 36 thus provides a convenient mechanism for accessing instructions that have been offset and that have had their lengths modified.

Upon receiving a requested fetch address 44, address translation table 36 is configured to select a set 66 of storage locations using index portion 60. From selected set 66 the stored address tags are compared with tag portion 62 in tag compare/way selection unit 70 to determine if there is a match. If there is a match, the pointer corresponding to the matching address tag in the selected set is conveyed to instruction cache 16. In response, instruction cache 16 is configured to output the instruction stored at that location. The instruction is then routed to scan/alignment unit 18.

Note the embodiment illustrated in FIG. 5 may be modified in any number of ways. For example, in one embodiment address translation table 36 may store multiple pointers for each address tag. In this manner, address translation table 36 may store sequences of pointers that indicate sequences were run of instructions of indicative of a predicted order of execution for the instructions stored in instruction cache 16. In another alternative, instruction cache 16 may be utilized without address translation table 36. For example, instruction cache 16 may be configured similarly to address translation table 36, except for storing the predecoded instruction in place of the pointer.

In one embodiment instruction cache 16 may comprise a plurality of fixed length instruction storage locations. Each storage location may be configured to store one fixed length instruction. In this embodiment, instruction cache 16 may be configured to output only the single instruction corresponding to the pointer received from address translation table 36. In this embodiment scan/alignment unit 18 may be greatly simplified. In another embodiment instruction cache 16 may be configured to output a fixed number of bytes starting with the byte pointed to by the pointer received from address translation table 36. Alternatively, instruction cache 16 may output the entire cache line corresponding to pointer 64. In yet another embodiment, instruction cache 16 may also be set-associative. In such an embodiment, portions of pointer 64 may be used to index a particular set within instruction cache 16, whereas other portions of pointer 64 may be compared with pointer tags stored in each way of instruction cache 16.

Method for Predecoding

Figure 7:
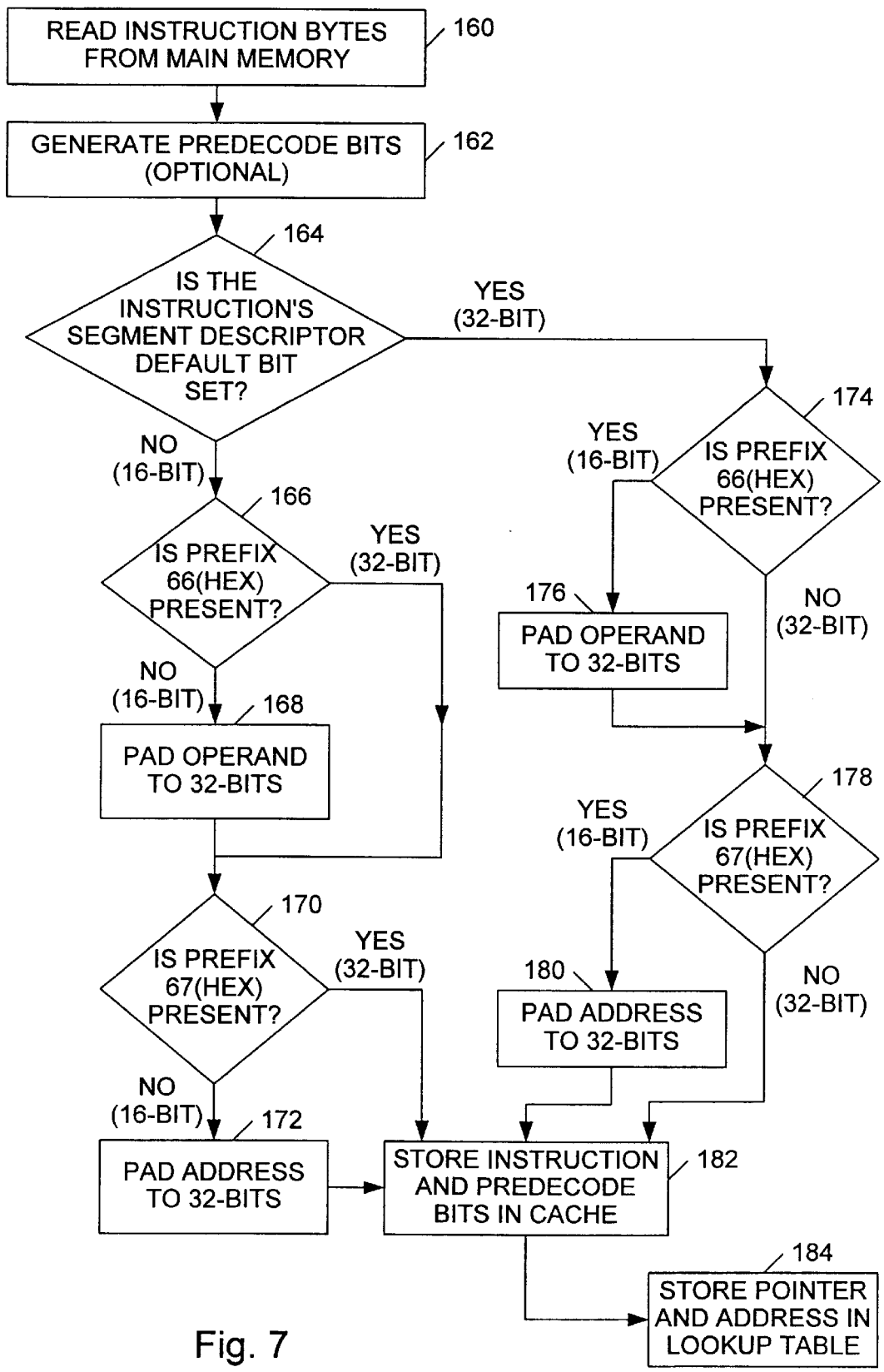
FIG. 7 is a flowchart illustrating one embodiment of a method for creating uniform address and operand lengths.

Turning now to FIG. 7, one embodiment of a method for predecoding instructions having variable address and operand lengths is shown. Note while this method (as in the examples above) assumes an x86-compatible instruction set, the embodiments described herein may be modified to also predecode other instruction sets having prefix bytes that influence address and operand length.

As shown in the figure, upon receiving a requested fetch or prefetch address, instruction bytes are read from a main memory subsystem (step 160). Next, predecode bits may be generated for each of the instruction bytes (step 162). The instruction's segment descriptor default bit is examined to determine the instruction's default address and operand size (step 164). If the instruction's segment descriptor default size bit is not set, the instruction's default address and operand size is 16 bits. The instruction's prefix bytes (if any) are also examined. If a prefix byte 66 (hex) is not present, then the operand has a length of 16 bits. Prefetch/predecode unit 12 is then configured to pad the operand with constants until it achieves a length of 32 bits (step 168). If, however, a prefix byte of 66 (hex) is present, then the instructions operand length is already 32 bits. Thus, prefetch/predecode unit need not pad the operand. Next, prefetch/predecode unit 12 determines whether or not a prefix byte of 67 (hex) is present (step 170). If the prefix byte is not present, then prefetch/predecode unit 12 is configured to pad any addresses within the instruction until they are 32 bit long (step 172).

Prefetch/predecode unit 12 is configured to perform similarly when the instruction segment descriptor default bit is asserted (i.e., a 32-bit default address and operand length). In this case, if a prefix byte of the 66 (hex) is present (step 174), then the instruction operand length is 16 bits. Thus, prefetch/predecode unit 12 is configured to pad any operands to a length of 32 bits (step 176). Similarly, if a prefix byte of 67 (hex) is present, then prefetch/predecode unit 12 is configured to pad the addresses to 32 bits (step 180). As the figure indicates, if neither prefix bytes are present, then prefetch/predecode unit 12 is configured route the instruction to instruction cache 16 without modification. Once prefetch/predecode unit 12 has completed predecoding the instruction, it is routed to instruction cache 16 for storage along with any corresponding predecode bits (step 182). Prefetch/predecode unit 12 is also configured to store a corresponding pointer into address translation table 36 as previously discussed (step 184). Optionally, prefetch/predecode unit 12 may also store an unmodified version of the instruction into secondary instruction cache 40.

Figure 8:
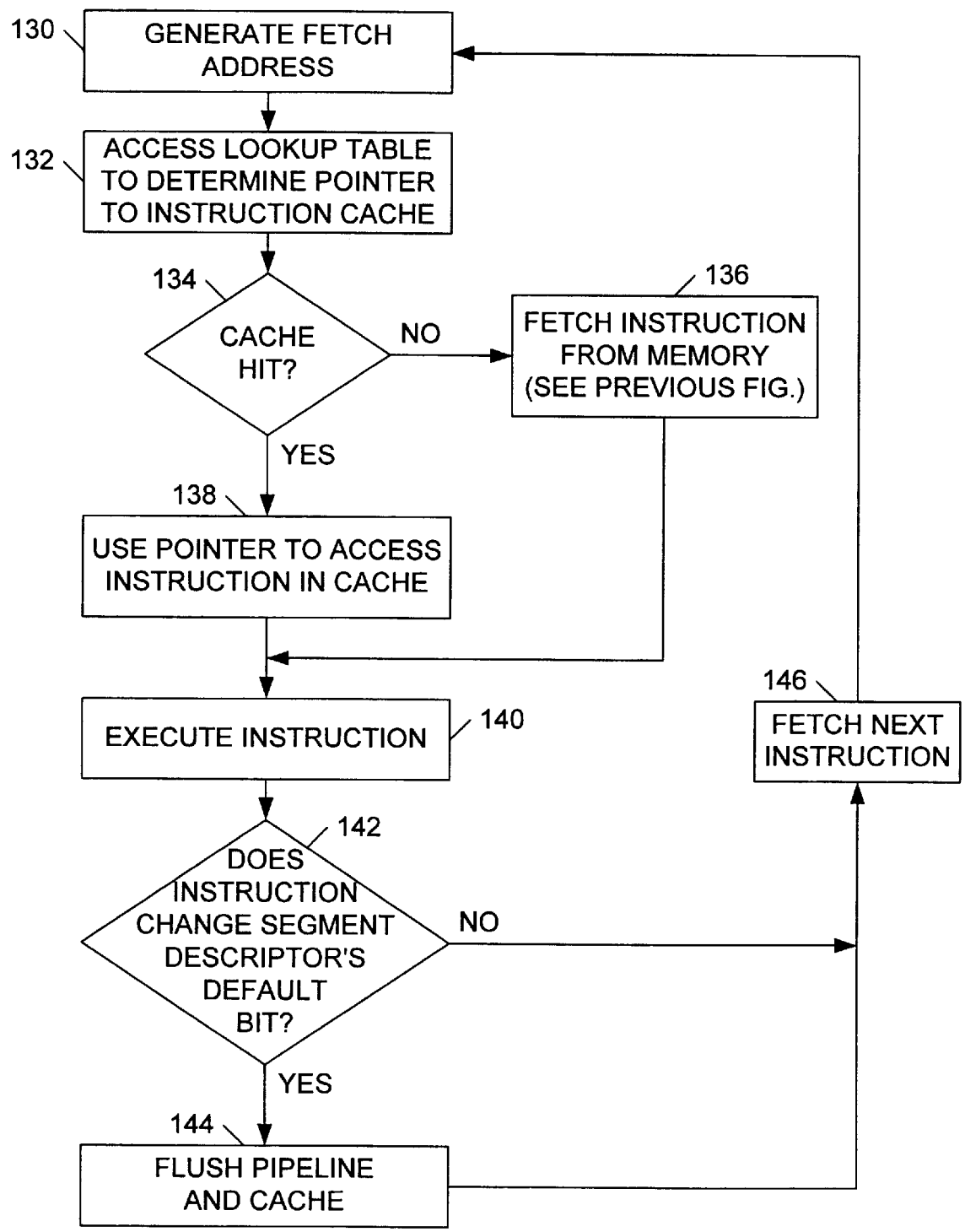
FIG. 8 is a flowchart illustrating one embodiment of a method for accessing stored predecoded instruction.

Turning now to FIG. 8, one embodiment of a method for accessing stored predecoded instruction is shown. First, a fetch address is generated and conveyed to prefetch/predecode unit 12 (step 130). Next, the fetch address is conveyed to address translation table 36 which uses the fetch address to look up a corresponding pointer to an instruction storage location within instruction cache 16 (step 132). Since each instruction stored in instruction cache 16 has a corresponding entry in address translation table 36, the presence (or lack thereof) of a pointer for a particular fetch address indicates whether or not there is an instruction cache hit (step 134). If a corresponding pointer is stored within address translation table 36, then this pointer is used to access the desired instruction in instruction cache 16 (step 138). If, however, a corresponding pointer is not present within address translation table 36, then the desired instruction is fetched from the main memory subsystem as previously discussed in FIG. 7 (step 136). Once the instruction is read from instruction cache 16, it is scanned, aligned, decoded, and executed (step 140). As previously noted, each instruction's segment descriptor determines the instruction's default operand and address length. Since a number of instructions may complete execution after a particular instruction is predecoded, the predecoded instruction's segment descriptor may be changed. For example, a second instruction completing execution after a first instruction is predecoded (and before the first instruction is executed) may overwrite the segment descriptor relied upon when predecoding the first instruction. This change may render the predecoded version of the first instruction incorrect. If prefetch/predecode unit 12 predecodes the first instruction assuming an incorrect default address and operand length, the padded version of the first instruction stored in instruction cache 16 will be incorrect.

While changes to a segment descriptor may occur relatively infrequently, microprocessor 10 may be configured to detect such changes when they occur (step 142). When an instruction modifies a segment descriptor, microprocessor 10 may be configured to flush any following instruction in the pipeline (i.e., instructions in scan/alignment unit 18, decode units 20A–C, reservation stations 22A–C, functional units 24A–C, and load/store unit 26). Similarly, microprocessor 10 may be configured to flush instruction cache 16 and address translation table 36 to prevent any improperly predecoded instruction from executing. Then, subsequent instructions are fetched from the main memory subsystem as previously disclosed (step 146). This effectively rebuilds address translation table 36 and instruction cache 16. Note, in some embodiments of microprocessor 10, optional secondary instruction cache 40 may be used to rebuild address translation table 36 and instruction cache 16 upon a segment descriptor change.

Exemplary Computer System

Figure 9:
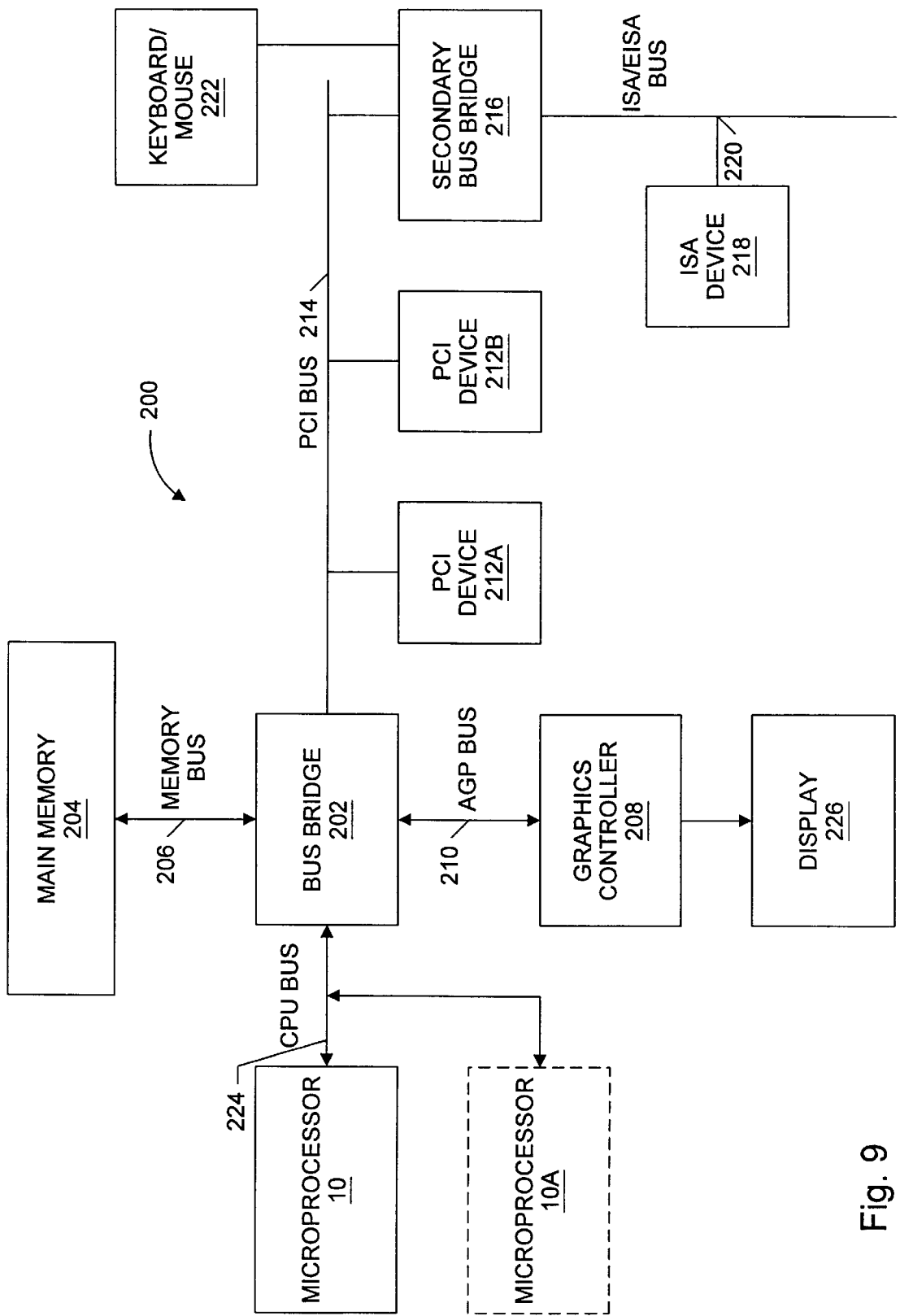
FIG. 9 is a block diagram of one embodiment of a computer system configured to use the microprocessor from FIG. 3.

Turning now to FIG. 9, a block diagram of one embodiment of a computer system 200 configured to use microprocessor 10 is disclosed. Computer system 200 is coupled to a variety of system components through a bus bridge 202 as shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

Bus bridge 202 provides an interface between microprocessor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports (e.g., a modem port for connecting a modem), as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM) or RDRAM (Rambus DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional microprocessors (e.g. microprocessor 10a shown as an optional component of computer system 200). Microprocessor 10a may be similar to microprocessor 10. More particularly, microprocessor 10a may be an identical copy of microprocessor 10. Microprocessor 10a may share CPU bus 224 with microprocessor 10 (as shown in FIG. 3) or may be connected to bus bridge 202 via an independent bus.

It will be appreciated by those skilled in the art having the benefit of this disclosure that this invention is believed to be capable of use with any microprocessor or computer system configured to execute instructions with prefix bytes that influence opcode and or address length. Furthermore, it is also to be understood that the form of the invention shown and described is to be taken as exemplary. Various modifications and changes may be made without departing from the spirit and scope of the invention as set forth in the claims. It is intended that the following claims be interpreted to embrace all such modifications and changes.

What is claimed is:

1. A microprocessor comprising:
    a predecode unit configured to receive instruction bytes from a main memory subsystem, wherein said predecode unit is configured to detect instructions having prefix bytes that override default operand and address field lengths, wherein said predecode unit is configured, in response to detecting said prefix bytes, to expand the operand fields and the address fields that are shorter than a predetermined length; and
    an instruction cache coupled to said predecode unit, wherein said instruction cache is configured to receive and store predecoded instructions, including said expanded operand fields and said expanded address fields, from said predecode unit.

2. The microprocessor as recited in claim 1, wherein said predecode unit is configured to expand said operand and address fields to said predetermined length by padding with constants.

3. The microprocessor as recited in claim 2, wherein said predecode unit is further configured to delete prefix bytes that override default operand and address field lengths before an instruction is stored in said instruction cache.

4. The microprocessor as recited in claim 2, further comprising an address translation table coupled to said instruction cache, wherein said address translation table is configured to store pointers to instructions stored within said instruction cache.

5. The microprocessor as recited in claim 4, wherein each pointer stored in said address translation table corresponds to a particular instruction address and points to an adjusted storage location that stores the corresponding instruction in said instruction cache, wherein each pointer compensates for changes in the corresponding instruction's storage location position resulting from said expanded operand fields and said expanded address fields.

6. The microprocessor as recited in claim 1, wherein said predecode unit is configured to detect and delete any prefix bytes that override default operand and address field lengths before the instructions are stored in the instruction cache.

7. A microprocessor comprising:
  a predecode unit configured to receive instruction bytes from a main memory subsystem, wherein said predecode unit is configured to detect instructions having prefix bytes that override default operand and address field lengths, wherein said predecode unit is configured to expand operand and address fields that are shorter than a predetermined length, wherein said predecode unit is configured to expand said operand and address fields to said predetermined length by padding with constants;
  an instruction cache coupled to said predecode unit, wherein said instruction cache is configured to receive and store predecoded instructions from said predecode unit;
  and
  an address translation table coupled to said instruction cache, wherein said address translation table is configured to store pointers to instructions stored within said instruction cache, wherein each pointer stored in said address translation table corresponds to a particular instruction address and points to the corresponding instruction in said instruction cache, wherein said microprocessor is configured to detect the execution of instructions that change the default operand and address size of a segment in said microprocessor, and, wherein said instruction cache and said address translation table are configured to flush stored instructions and pointers upon receiving a signal from said microprocessor that the default operand or default address size of a memory segment has changed.

8. A microprocessor comprising:
  a predecode unit configured to receive instruction bytes from a main memory subsystem, wherein said predecode unit is configured to detect instructions having prefix bytes that override default operand and address field lengths, wherein said predecode unit is configured to expand operand and address fields that are shorter than a predetermined length, wherein said predecode unit is configured to expand said operand and address fields to said predetermined length by padding with constants;
  an instruction cache coupled to said predecode unit, wherein said instruction cache is configured to receive and store predecoded instructions from said predecode unit; and
  an address translation table coupled to said instruction cache, wherein said address translation table is configured to store pointers to instructions stored within said instruction cache, wherein each pointer stored in said address translation table corresponds to a particular instruction address and points to the corresponding instruction in said instruction cache, wherein said microprocessor is configured to detect the execution of instructions that change the default operand and address size of a segment in said microprocessor, and, wherein said instruction cache and said address translation table are configured to flush stored instructions and pointers upon receiving a signal from said microprocessor that the default operand and address size of a code segment has changed.

9. The microprocessor as recited in claim 8, wherein said predecode unit is further configured to generate one or more predecode bits for each instruction byte, wherein said predecode unit is configured to store said predecode bits in said instruction cache with said predecoded instructions.

10. The microprocessor as recited in claim 8, further comprising a secondary cache coupled to said predecode unit, wherein said predecode unit is configured to store all instruction bytes received and corresponding predecode bits in said secondary cache without padding.

11. The microprocessor as recited in claim 10, wherein said predecode unit is configured to rebuild said instruction cache after said instruction cache is flushed using instructions and predecode information stored in said secondary cache.

12. The microprocessor as recited in claim 11, wherein said predecode unit is further configured to rebuild said address translation table after said instruction cache is flushed using instructions stored in said secondary cache.

13. A method for predecoding instructions comprising:
  reading a plurality of instruction bytes from a main memory subsystem;
  detecting instructions within the plurality of instruction bytes that have prefix bytes which override the instruction's default address and operand field size;
  expanding the address fields and the operand fields that are smaller than a predetermined size in response to detecting said prefix bytes; and
  storing the instructions, including said expanded operand fields and said expanded address fields, in an instruction cache.

14. The method as recited in claim 13, further comprising maintaining an address translation table for the predecoded instructions stored the instruction cache, wherein the address translation table translates addresses by adjusting for the expanded address and operand fields.

15. The method as recited in claim 14, further comprising generating one or more predecode bits for each instruction byte.

16. A method for predecoding instructions comprising:
  reading a plurality of instruction bytes from a main memory subsystem;
  detecting instructions within the plurality of instruction bytes that have prefix bytes which override the instruction's default address and operand field size;
  expanding address and operand fields that are smaller than a predetermined size;
  storing the instructions in an instruction cache;
  maintaining an address translation table for the predecoded instructions stored the instruction cache;
  generating one or more predecode bits for each instruction byte; and storing each instruction in unaltered form with any corresponding predecode bits in a secondary cache.

17. The method as recited in claim 16, further comprising:

detecting the execution of instructions that modify segment descriptors, and flushing the instruction cache and the address translation table.

18. The method as recited in claim 17, further comprising rebuilding the instruction cache and address translation table after said flushing by predecoding instructions from the secondary cache.

19. The method as recited in claim 17, wherein said flushing comprises invalidating entries corresponding to the modified segment.

20. A computer system comprising:

a first microprocessor;

a CPU bus coupled to said first microprocessor; and a modem coupled to said CPU bus, wherein said first microprocessor comprises:

a predecode unit configured to receive instruction bytes from a main memory subsystem, wherein said predecode unit is configured to detect instructions having prefix bytes that override default operand and address field lengths, wherein said predecode unit is configured, in response to detecting said prefix bytes, to expand operand and address fields that are shorter than a predetermined length, wherein said predecode unit is configured to expand said operand and address fields to said predetermined length by padding with constants, wherein said predecode unit is further configured to delete any prefix bytes that override default operand and address field lengths; and an instruction cache coupled to said predecode unit, wherein said instruction cache is configured to receive and store predecoded instructions, including said expanded operand fields and said expanded address fields, from said predecode unit.

21. The computer system as recited in claim 20, further comprising a second microprocessor coupled to said first microprocessor via said CPU bus.

* * * * *